(12) United States Patent
Haller et al.

(10) Patent No.: US 8,579,267 B2
(45) Date of Patent: Nov. 12, 2013

(54) VEHICLE OSCILLATION DEVICE

(75) Inventors: Erwin Haller, Birgland (DE); Jens Kolb, Königstein (DE)

(73) Assignee: Grammer AG, Amberg (DE)

( * ) Notice: Subject to any disclaimer, the term of this patent is extended or adjusted under 35 U.S.C. 154(b) by 152 days.

(21) Appl. No.: 13/217,640

(22) Filed: Aug. 25, 2011

(65) Prior Publication Data
US 2012/0049421 A1 Mar. 1, 2012

(30) Foreign Application Priority Data

Aug. 30, 2010 (DE) .......................... 10 2010 035 888

(51) Int. Cl.
*B60G 11/56* (2006.01)

(52) U.S. Cl.
USPC ......... 267/34; 267/131; 267/140.11; 248/564

(58) Field of Classification Search
USPC .......... 267/33, 34, 136, 140.11, 140.3, 140.5, 267/195, 216, 131; 248/562, 564, 636; 297/344.11, 344.14, 344.15, 344.16, 297/344.18, 344.19
See application file for complete search history.

(56) References Cited

U.S. PATENT DOCUMENTS

| | | |
|---|---|---|
| 2,118,456 A | 5/1938 | Whedon |
| 3,300,203 A | 1/1967 | Carter et al. |
| 3,752,432 A | 8/1973 | Lowe |
| 4,151,973 A | 5/1979 | Sedlock |
| 4,213,594 A | 7/1980 | Pietsch et al. |
| 4,286,765 A | 9/1981 | Delgleize et al. |
| 4,350,317 A | 9/1982 | Aondetto |
| 4,408,744 A | 10/1983 | Thompson |
| 4,451,079 A | 5/1984 | Takahashi |
| 4,477,050 A * | 10/1984 | Thompson et al. ........... 248/636 |
| 4,573,657 A | 3/1986 | Sakamoto |
| 4,645,169 A | 2/1987 | Mischer |
| 4,679,760 A | 7/1987 | Dotzler et al. |
| 4,684,100 A | 8/1987 | Grassl |
| 4,729,539 A | 3/1988 | Nagata |

(Continued)

FOREIGN PATENT DOCUMENTS

| | | |
|---|---|---|
| CN | 100493951 C | 6/2009 |
| DE | 1 898 307 U | 8/1964 |

(Continued)

OTHER PUBLICATIONS

Search Report for European Patent Application No. 11177689.4, mailed Dec. 14, 2011.

(Continued)

*Primary Examiner* — Thomas J Williams
(74) *Attorney, Agent, or Firm* — Lathrop & Gage LLP

(57) ABSTRACT

The invention concerns a vehicle oscillation device with a lower part (1) and an upper part (2, 2a, 2b) positioned higher and spring-mounted in relation to the lower part (1) in the vehicle longitudinal direction (21) and/or vehicle width direction (22) by a spring device (7, 7a, 7b, 8; 18), wherein the vehicle longitudinal direction (21) and/or the vehicle width direction (22) constitute spring travel directions (9, 11), wherein at least one damper (3, 3a; 4, 4a) is arranged which extends with its longitudinal extension in a plane defined by the vehicle longitudinal direction (21) and the vehicle width direction (22), is mounted on the lower part (1) pivotably about an axis (17, 24) oriented perpendicular to the plane, and is connected with a first end (5, 5a; 6, 6a; 16) to the upper part (2).

6 Claims, 4 Drawing Sheets

(56) References Cited

U.S. PATENT DOCUMENTS

Figure 1:
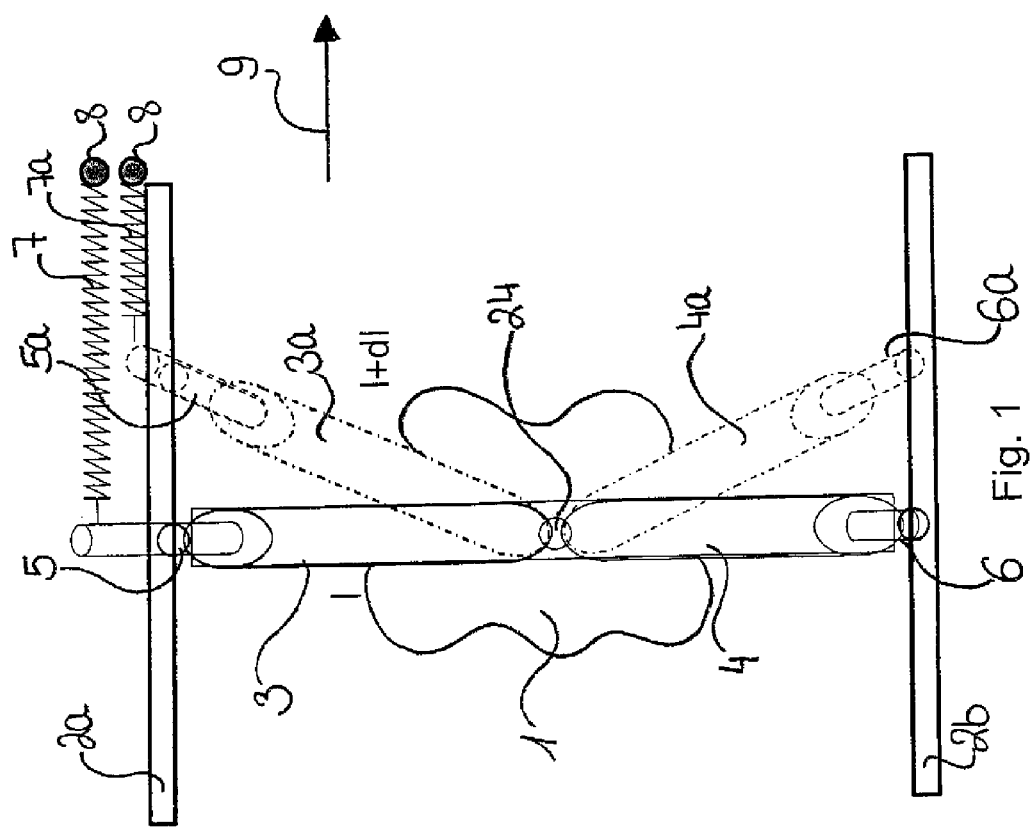

| Patent Number | Date | Inventor |
|---|---|---|
| 4,773,671 A | 9/1988 | Inagaki |
| 4,784,434 A | 11/1988 | Iwami |
| 4,856,763 A | 8/1989 | Brodersen et al. |
| 4,943,037 A | 7/1990 | Brodersen et al. |
| 4,993,778 A | 2/1991 | Colin et al. |
| 5,058,852 A | 10/1991 | Meier et al. |
| 5,125,631 A | 6/1992 | Brodersen et al. |
| 5,211,369 A | 5/1993 | Hoemer |
| 5,251,864 A | 10/1993 | Itou |
| 5,364,060 A | 11/1994 | Donovan et al. |
| 5,521,821 A | 5/1996 | Shimizu et al. |
| 5,533,703 A | 7/1996 | Grassl et al. |
| 5,553,911 A * | 9/1996 | Bodin et al. .................. 248/562 |
| 5,582,385 A | 12/1996 | Boyle et al. |
| 5,735,509 A | 4/1998 | Gryp et al. |
| 5,765,802 A | 6/1998 | Bostrom et al. |
| 5,791,738 A | 8/1998 | Niezoldt |
| 5,794,911 A | 8/1998 | Hill |
| 5,871,198 A | 2/1999 | Bostrom et al. |
| 5,957,426 A | 9/1999 | Brodersen |
| 5,967,604 A | 10/1999 | Yoshida et al. |
| 5,971,116 A | 10/1999 | Franklin |
| 6,042,093 A | 3/2000 | Garelick |
| 6,340,201 B1 | 1/2002 | Higuchi |
| 6,478,102 B1 | 11/2002 | Puterbaugh et al. |
| 6,543,755 B2 | 4/2003 | Monson et al. |
| 6,616,116 B1 | 9/2003 | Rochau et al. |
| 6,637,735 B2 | 10/2003 | Monson et al. |
| 6,763,550 B2 | 7/2004 | Regnier |
| 6,802,408 B2 * | 10/2004 | Krammer .................. 188/282.8 |
| 7,044,553 B2 | 5/2006 | Ropp |
| 7,152,839 B2 | 12/2006 | Mullinix et al. |
| 7,168,671 B2 | 1/2007 | Bostrom et al. |
| 7,185,867 B2 | 3/2007 | Hill et al. |
| 7,712,836 B2 | 5/2010 | Deml |
| 7,810,884 B2 | 10/2010 | Lorey et al. |
| 7,886,882 B2 | 2/2011 | Behmenburg et al. |
| 7,942,248 B2 | 5/2011 | St. Clair et al. |
| 8,118,287 B2 | 2/2012 | Schordine |
| 2001/0035600 A1 | 11/2001 | St. Clair |
| 2002/0011699 A1 | 1/2002 | St. Clair |
| 2006/0278805 A1 | 12/2006 | Haller |
| 2007/0278723 A1 | 12/2007 | Shoemaker et al. |
| 2008/0000738 A1 | 1/2008 | Zdeb |
| 2008/0000739 A1 | 1/2008 | Behmenburg et al. |
| 2008/0088165 A1 | 4/2008 | Deml |
| 2008/0156602 A1 | 7/2008 | Hiemenz et al. |
| 2008/0197684 A1 | 8/2008 | Ott et al. |
| 2009/0134595 A1 | 5/2009 | Haller et al. |
| 2009/0179390 A1 | 7/2009 | Wurmthaler et al. |
| 2009/0184448 A1 | 7/2009 | Hiser |
| 2009/0256293 A1 | 10/2009 | Ward |
| 2009/0283944 A1 | 11/2009 | Schordine |
| 2010/0052356 A1 | 3/2010 | Lewis, II |
| 2010/0072800 A1 | 3/2010 | Weber et al. |
| 2010/0102493 A1 | 4/2010 | Deml et al. |
| 2010/0117428 A1 | 5/2010 | Deml et al. |
| 2011/0001033 A1 | 1/2011 | Kohl et al. |
| 2011/0001342 A1 | 1/2011 | Deml et al. |
| 2011/0022265 A1 | 1/2011 | Sekiya |
| 2011/0226930 A1 | 9/2011 | Enns et al. |
| 2011/0278894 A1 | 11/2011 | Lorey |
| 2012/0025577 A1 | 2/2012 | Kolb |
| 2012/0043798 A1 | 2/2012 | Haller et al. |
| 2012/0049421 A1 | 3/2012 | Haller et al. |
| 2012/0086159 A1 | 4/2012 | Kolb |
| 2012/0090930 A1 | 4/2012 | Haller |
| 2012/0091773 A1 | 4/2012 | Lorey |
| 2012/0126592 A1 | 5/2012 | Kaessner et al. |
| 2012/0153689 A1 | 6/2012 | Haller et al. |
| 2012/0153695 A1 | 6/2012 | Haller et al. |
| 2012/0187615 A1 | 7/2012 | Haller et al. |

FOREIGN PATENT DOCUMENTS

| | | |
|---|---|---|
| DE | 15 55 056 | 3/1970 |
| DE | 19 16 403 A1 | 10/1970 |
| DE | 21 13 579 | 10/1972 |
| DE | 28 06 247 C2 | 8/1979 |
| DE | 28 11 034 A1 | 9/1979 |
| DE | 28 51 129 A1 | 6/1980 |
| DE | 32 42 287 A1 | 5/1984 |
| DE | 35 17 345 A1 | 11/1986 |
| DE | 38 24 272 A1 | 3/1990 |
| DE | 41 01 221 A1 | 7/1992 |
| DE | 696 06 732 T2 | 4/1995 |
| DE | 197 56 252 A1 | 7/1998 |
| DE | 197 41 602 A1 | 3/1999 |
| DE | 19741602 | 3/1999 |
| DE | 603 20 456 T2 | 12/2002 |
| DE | 69908290 | 5/2004 |
| DE | 10 2005 028 725 A1 | 1/2006 |
| DE | 10 2006 016 047 B3 | 4/2006 |
| DE | 10 2005 003 833 | 6/2006 |
| DE | 10 2005 011 856 B3 | 8/2006 |
| DE | 10 2007 030 467 A1 | 1/2009 |
| DE | 10 2008 016 685 B3 | 6/2009 |
| DE | 10 2008 010 719 A1 | 8/2009 |
| DE | 10 2008 045 492 A1 | 3/2010 |
| DE | 102008052960 | 4/2010 |
| DE | 10 2008 056 200 A1 | 5/2010 |
| DE | 10 2009 020 034 A1 | 11/2010 |
| DE | 10 2009 040 010 A1 | 1/2011 |
| EP | 0 054 880 A1 | 12/1981 |
| EP | 0 054 947 A1 | 12/1981 |
| EP | 0 089 794 | 9/1983 |
| EP | 0 448 340 A2 | 9/1991 |
| EP | 0 739 766 | 10/1996 |
| EP | 1 035 258 A1 | 6/1999 |
| EP | 2 420 404 | 2/2012 |
| GB | 1 166 258 | 10/1969 |
| GB | 1199577 | 7/1970 |
| GB | 1 383 922 | 2/1974 |
| GB | 2 014 522 | 8/1979 |
| JP | 09136611 | 5/1997 |
| JP | 2007 062 539 A | 3/2007 |
| WO | WO 2004/110808 | 12/2004 |

OTHER PUBLICATIONS

Extended European Search Report for parallel European Patent Application No. 11 19 5031, mailed Apr. 5, 2012.
First Office Action dated Mar. 29, 2012 for Chinese Patent Application No. 201010244916.3.
First Office Action dated Mar. 29, 2012 for Chinese Patent Application No. 201010244916.3, English translation.
Office Action, Chinese Patent Application No. 201110052443.1, dated Dec. 30, 2012.
Office Action, Chinese Patent Application No. 201110052443.1, dated Dec. 30, 2012, English Translation.
Extended European Search Report for European Patent Application No. 12 15 9863, dated Jul. 4, 2012.
Extended European Search Report for parallel European Patent Application No. 11 19 5039, mailed Apr. 5, 2012.

* cited by examiner

VEHICLE OSCILLATION DEVICE

CROSS REFERENCE TO RELATED APPLICATION

This application claims the benefit of priority from German Patent Application No. 10 201 0 035 888.6, filed on Aug. 30, 2010, which is hereby incorporated by reference in its entirety to the extent not inconsistent with the disclosure herein.

DESCRIPTION

The invention concerns a vehicle oscillation device with a lower part and an upper part spring-mounted in relation to the lower part in the vehicle longitudinal direction and/or the vehicle width direction by means of a spring device.

Such horizontal springs are often produced in vehicle seats such that at least one coil spring arranged horizontally connects springable a lower part with an upper part of the vehicle seat. Thus on induction of a horizontal oscillation/vibration such as can occur when passing over a protrusion on the road, the upper part can swing forward in relation to the lower part and thus absorb the horizontally induced oscillation by springing. In addition, evidently vertically induced oscillations are absorbed by separate spring devices in the vertical direction.

Such spring devices reacting to horizontally acting or induced oscillations have the disadvantage that the resulting spring vibrations are not attenuated. Rather swinging more and more of the entire system can occur as a result, until the occurrence of resonance effects, insofar as the coil spring has a corresponding great spring force and consequently is designed sufficiently hard to damp out all oscillations. If the coil spring however is designed with less spring force, there is a risk that the coil spring will meet its end stops during a spring vibration and thus the upper part will be stopped suddenly during the oscillation process. Both effects are undesirable.

Consequently the present invention is based on the object of providing a vehicle oscillation device with a lower part and an upper part spring-mounted in relation to the lower part in the vehicle longitudinal direction and/or the vehicle width direction, which offers increased comfort for the person using the vehicle when horizontally oriented oscillations/vibrations are introduced.

An essential concept of the invention is that in a vehicle oscillation device with a lower part and an upper part spring-mounted in relation to the lower part in the vehicle longitudinal direction and/or vehicle width direction by means of a spring device, wherein the vehicle longitudinal direction and/or the vehicle width direction constitute spring travel directions, at least one damper is arranged which extends with its longitudinal extent in a plane spanned by the vehicle longitudinal direction and the vehicle width direction, is mounted on the lower part pivotable about an axis oriented perpendicular to the plane, and with a first end is connected with the upper part. Such a vehicle oscillation device allows the arrangement of a horizontally oriented damper which attenuates the oscillations of the upper part in the horizontal direction or parallel to the vehicle floor and thus allows a reduction in the oscillation amplitudes. Such a damper can be used both alone or in combination with a spring such as for example a coil spring, wherein the oscillation of the coil spring would be damped by the damper. This has the result that the vibrations induced initially in the device, not only in the vertical but also in the horizontal direction such as for example occur when driving over a bump or through a dip, can be rapidly attenuated.

It is advantageous for this that the at least one damper, in a undeflected position of the spring-mounted upper part, is arranged such that it extends in its longitudinal extent perpendicular to the spring travel direction. This means that when the spring travel direction runs in the vehicle longitudinal direction, the damper in the undeflected position of the spring-mounted upper part extends with its longitudinal extent in the vehicle width direction so that it is oriented perpendicular to the vehicle longitudinal direction. A damper arranged in this manner, because it is attached with its first end to the upper part, would be deflected by a shift or oscillation of the upper part to different extents in the horizontal direction, performing a simultaneous pivoting movement about the axis. For this the axis is arranged either at the second end of the damper or further to the centre of the damper in relation to its longitudinal extent. The arrangement of the axis depends amongst others on whether the damper is to provide a hard or soft damping, because the distance from the axis to the first end of the damper which is attached to the upper part and would swing forward and back in a spring travel direction in the vehicle longitudinal direction, determines the degree of hardness of the damper because of the pivoting movement with a larger or smaller radius.

The damper is advantageously formed such that by tensile loading of the damper, its first damper force with damping effect is different from the second damper force acting under compression load on the damper. This means that on extension of the damper for example a higher countering damping force is present than on retraction of the damper i.e. in the compression stage instead of the tension stage of the damper. On springing back, the damper retracts to the central position i.e. the undeflected position. During such retraction there is sufficient spring travel for the first end of the damper which is attached to the upper part and moves in the forward and backward direction, insofar as the spring travel direction is the vehicle longitudinal direction, since beyond the central position there is a spring travel in the opposing direction. Such a distinction into different degrees of damping or damper forces during the compression stage and the tension/rebound stage of the damper leads to an increased vibration isolation of the entire device and hence rapid diminution of the spring vibration of the sprung upper part. Evidently the different damping forces can be adjustable for the compression and tension/rebound stage i.e. their value can be factory-set or selected by the user of the vehicle.

Such vehicle oscillation devices are advantageously used not only for vehicle seats with an upper and a lower part but also for vehicle cabs such as for example on tractors.

As already stated, the spring device can comprise at least one first coil spring extending in the spring travel direction, its first end being connected with the upper part and its second end with the lower part. Thus on displacement of the upper part in relation to the lower part during induction of an external oscillation, an extension and contraction of the first coil spring takes place while the damper achieves a damping of this spring oscillation.

According to a preferred embodiment the spring device comprises at least one second coil spring arranged in or on the damper, the first end of which is connected with the first end of the damper or the element of the upper part to which the first end of the damper is attached, and the second end of which is connected with the second end of the damper or another part of the damper. This allows the use of a damper-spring unit which can be present in integral form. The second coil spring can thus be used instead of or in addition to the first coil spring. Evidently also more than one first and one second coil spring can be used, in order to increase the spring effect and spring force.

According to a preferred embodiment at least one elastomer part is provided which is arranged in or on the damper to attenuate acceleration maxima of the oscillation or spring movement of the device. Such attenuation of the acceleration maxima which can occur on rapid induction of external vibration when suddenly driving over a bump or deep dip, has the advantage that the entire spring travel available need not be exhausted with the risk of reaching the end stop of the spring device or displacement travel of the upper part in relation to the lower part even if a damper is present. Such an elastomer part which can be formed as an elastomer bearing can be integrated in the tension/rebound stage of the damper as a closed pore spring element, i.e. placed such that the effect of the elastomer bearing is only used when the damper is extended and thus deflected out of its rest position. Such an elastomer bearing is advantageously arranged inside the damper or at the damper pivot points which occur as connecting points between the damper and the lower or upper part.

During oscillation induction, the elastomer part is advantageously first compressed or expanded depending on whether the elastomer part is arranged inside or on the damper and how it is formed in its material properties. This takes place until an oil exchange occurs via a piston within the damper to initiate the normal function method of the damper. As soon as such an elastomer part is used in combination with a damper and in combination with a spring arranged therein which acts linear in relation to its spring force, a progressive effect of the spring can be achieved in relation to speed. This means that the speed of the induced oscillation behaves progressively in relation to the spring travel available and thus a strong damping occurs at an initial high speed. Such a damper is conventionally described as progressive in relation to speed.

An integrated spring can be a coiled steel spring which is arranged as a common spring-damper element inside or outside the damper and connected therewith.

According to a refinement of the invention a second damper is present, the first end of which is also connected with the upper part and which is mounted pivotable about the axis or a further axis. This second damper—like the first damper—can serve to attenuate the oscillation of the upper part in the horizontal direction in relation to the lower part and is preferably arranged, together with the first damper in an undeflected position of the spring-mounted upper part, on a common straight line in relation to the longitudinal extent of the two dampers. This means that in the rest position the dampers are arranged in succession in the vehicle width direction, insofar as the spring travel direction runs in the vehicle longitudinal direction, and at their second end are arranged for example jointly swivellable about the axis, whereas their first ends can be attached on two different components of the upper part which also move on displacement of the upper part when an oscillation is induced.

Figure 2A:
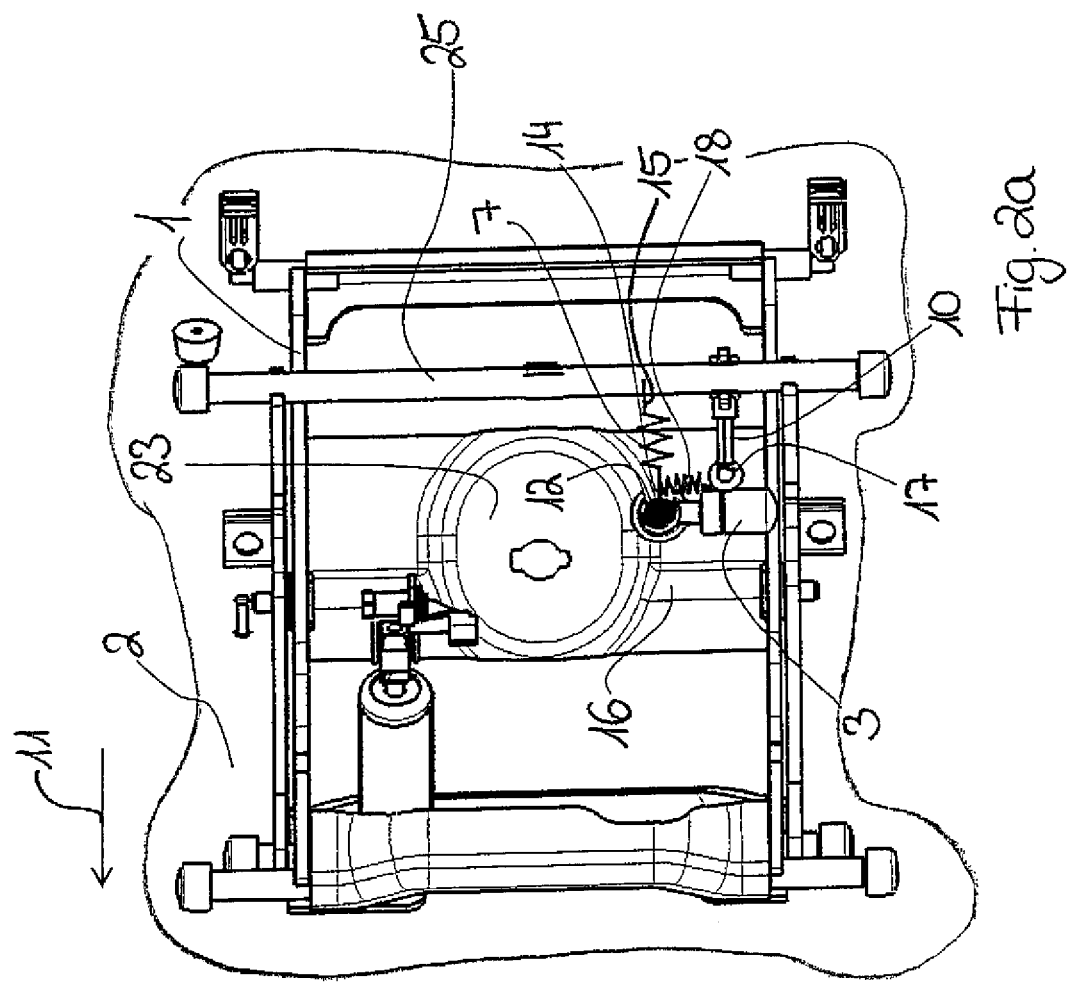
Figure 2B:
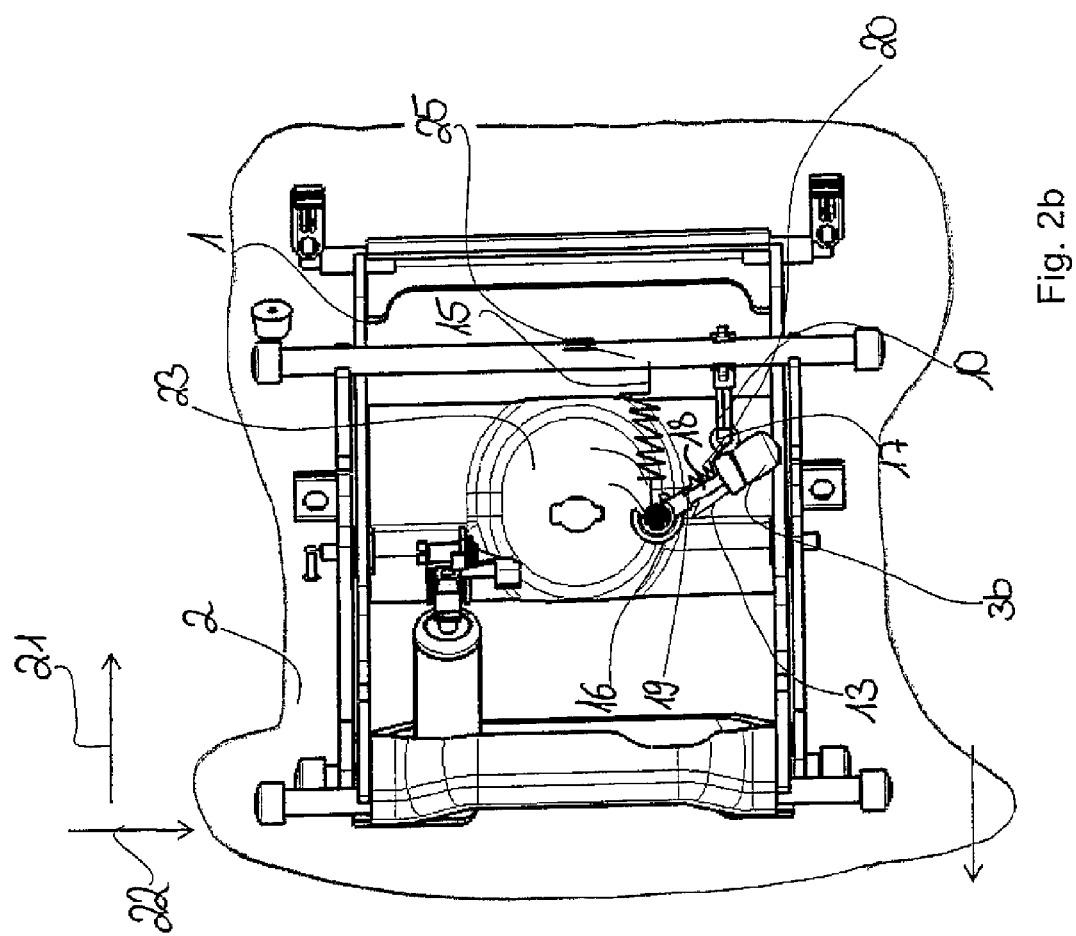
Figure 3:
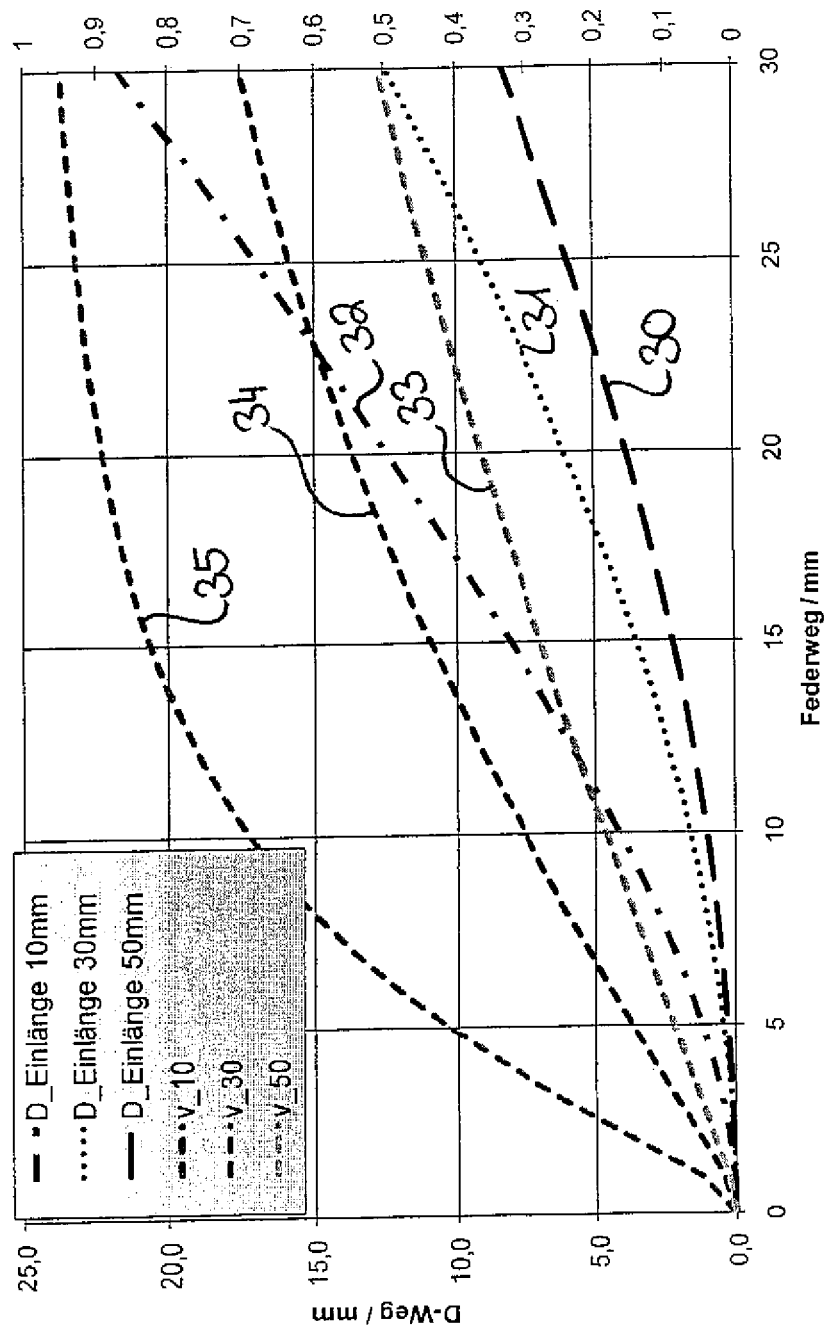

Benefits and suitable features are described below in connection with the drawing. This shows:

FIG. 1 in a diagrammatic depiction, the basic principle of the vehicle oscillation device according to the invention in one embodiment of the invention;

FIG. 2a in a diagrammatic depiction, a section of a vehicle seat with the vehicle oscillation device according to the invention in a rest position;

FIG. 2b in a diagrammatic depiction and in top view, a section of a vehicle seat with the vehicle oscillation device according to the invention in extended or deflected position; and FIG. 3 in a diagram, individual measured values of a damper travel in relation to an available spring travel and speed ratio values for a vehicle oscillation device according to the present invention.

FIG. 3
Einlänge=retracted length
D-Weg/mm=D travel/mm
Federweg/mm=spring travel/mm FIG. 1 shows in diagrammatic depiction the basic principle of the vehicle oscillation device according to the invention according to one embodiment of the invention. It is clear from this depiction that two dampers 3, 4 are attached to a lower part 1—here shown only in section—and to two parts 2a, 2b of the upper part. The depiction of the dampers according to reference signs 3, 4 shows the dampers in rest position, where in contrast the depiction according to reference numerals 3a and 4a shows both dampers in deflected or extended position.

A first end 5 or 5a is attached to the first component 2a of the upper part and is moved to the right together with component 2a on movement of the upper part according to arrow 9 to the right viewed in the image plane. This happens because an external oscillation has been induced on the device, for example from the right, by passing over a sharp protrusion. This has the consequence that the lower part 1 is briefly stopped or decelerated while the upper part with components 2a and 2b is moved oscillating to the right.

Also a first end 6 or 6a is moved to the right when such an oscillation is induced and the upper part is moved in the direction of arrow 9 by the component 2b.

The entire depiction according to FIG. 1 should be understood to mean that for example the vehicle longitudinal direction extends from left to right viewed in the image plane, and the right side is the vehicle front and the left side the vehicle rear. Preferably the fundamental principle sketch shown in FIG. 1 is a device for a vehicle seat and can also be used for a vehicle cab, for example for tractors. Consequently the two dampers 3, 4 extend on a straight line running in the vehicle width direction i.e. from top to bottom viewed in the image plane.

As soon as the upper part with its two components 2a, 2b moves from left to right i.e. in the vehicle forward direction, the two dampers according to reference numerals 3a and 4a at their first ends 5a and 6a move to the right and there is a pivoting movement about an axis 24 connected with the lower part. Preferably the two dampers 3, 4 are arranged horizontally i.e. between the lower part 1 and the upper part 2.

The spring force of the spring 7, which in this case is formed as a coil spring, counteracts the induced external oscillation movement and the movement of the upper part to the front or to the right. On a forward movement of the upper part the spring in this case is compressed, as shown in the depiction according to reference numeral 7a. The spring 7 or 7a is for example attached to a peg 8 on one side and to the end 5 of the damper 3 on the other, wherein the peg 8 has a connection to the lower part. On the second damper 4, this spring is not shown but can also be present.

If two dampers are used as in the present case, a resulting force component perpendicular to the movement direction can be compensated. The second damper, in the pivot function i.e. the vehicle longitudinal direction, also constitutes a doubling of the resulting damper force in the longitudinal direction. This design brings a translation and adaptation of the progressively acting damper curve.

Alternatively to attaching the swivel axis 24 at one end of the damper as shown in FIG. 1, the swivel axis can be attached in any section of the damper viewed in the longitudinal direction. This means that if for example the swivel axis were arranged approximately in the centre of the longitudinal extension of the damper, a shorter lever arm with for example one first end 5a is connected the moving upper part. This leads to a smaller orbit during the shifting movement of the upper part and the oscillation movement of the damper, and leads to a greater swivel range of the damper. As a result a damper piston speed is achieved which in the end region of the spring travel end has approximately the spring travel speed of the spring. Thus, the shorter the lever arm of the damper from the swivel axis to the upper end because of the movement of the swivel axis, the earlier the damper piston speed can reach the spring travel speed. For this the swivel axis can be arranged at the side or on the outside of the damper in order not to adversely affect the function of the damper because of a bore for attaching the swivel axis.

FIGS. 2a and 2b show a top view of part of a vehicle seat with a vehicle oscillation device according to the invention, wherein in FIG. 2a the vehicle oscillation device is in the rest position and in FIG. 2b in the extended or deflected position. The same and similar reference numerals are used for the same components.

Reference numeral 21 indicates the vehicle longitudinal direction and reference numeral 22 the vehicle width direction, wherein these two directions 21, 22 can span/define a plane on which, or on a further plane parallel to this plane, can be attached dampers 3a and 3b with or without a further coil spring 7 or 7b and/or 18 or 18a.

It is clear from this depiction that the lower part 1 comprises a multiplicity of components which are mainly used for arrangement of a scissor-type frame for the height adjustment of the vehicle seat and for attachment of this scissor-type frame within guide rails attached to the body on the floor. Amongst others the lower part with the associated scissor frame comprises a rod 25 extending in the vehicle width direction 22 on which is arranged an extension arm 10 as a fixing element for the damper 3. This extension arm 10 at one end has a swivel head 17 on which the damper 3 is arranged and about which the damper 3 can be swivelled. This is clear from a comparison of FIGS. 2a and 2b. The damper 3 is thus attached with its base body at the swivel head 17 and hence on the lower part of the vehicle seat and the vehicle oscillation device, and with its first end which is formed as a gripper arm and designated with reference numeral 16 is attached to a bolt-like element 12 which allows a swivel movement between the element 16 and the bolt 12. The bolt 12 in turn is attached to an upper part 2, indicated here merely stylistically and transparently.

Assuming that—viewed in the image plane—the right side is the vehicle front and the left side the vehicle rear, on a reversing movement with the vehicle simultaneously driving over a protrusion, the upper part 2 is moved to the left according to arrow 11—i.e. towards the vehicle rear—and begins an oscillation movement under this induced vibration. This deflects the spring 7 as indicated with reference numeral 7b. The spring is attached with its first end 14 on the bolt element 12 and thus has a connection to the upper part 2, while with its further end 15 it is attached to the lower part, in this case the rod element 25.

Also such a movement of the upper part to the left or towards the rear swivels the damper 3 about swivel head 17 according to numeral 3b, thus achieving a position tilted in relation to the rest position. According to numeral 13, this leads to a tension on the damping element and a damping counterforce ensures that the oscillation movement of the upper part—momentarily directed towards the left—is attenuated in its movement.

Alternatively or additionally a further spring 18, formed as a coil spring and shown in the extended position with reference numeral 18a, can be arranged parallel to or inside the damper 3 or 3b and is also tensioned on movement of the damper. This is because the first end 19 of the spring 18 is also attached to the bolt element 12 or a first end of the damper 3b, and a second end 20 of the spring 18 or 18a is arranged on the base body of the damper 3b or on the swivel head 17.

It is clear from this depiction that on movement of the upper part in the direction of arrow 11 because of an induced oscillation, the damping element—like springs 7, 18—can be deflected, wherein the damping element advantageously generates a damping counterforce against the oscillation movement directed to the left or rear.

Springs 7 and/or 7b and 18 and/or 18a shown in FIGS. 2a and 2b are loaded under tension in the deflected position, whereas the spring 7 shown in FIG. 1 is loaded under compression in the deflected position.

Swivel head 17 with element 10 in combination with the damper is arranged such that only a limited space is available within the vehicle seat. The swivel head 17 is thus also a damper connection point and arranged at the side on the base body of the damper.

Reference numeral 23 designates stylistically a pneumatic spring in the vertical direction.

FIG. 3 shows in a diagram different values for damper travel and spring travel available and speed ratios for the vehicle oscillation device according to the invention. On the left-hand side, the ordinate indicates the measured damper travel in mm, and the abscissa shows the spring travel in the spring travel direction, also given in mm.

Dampers with different retracted lengths are shown. This means that they are formed differently in the swivel attachment i.e. the arrangement of the swivel axis. The swivel axis can consequently be arranged in different regions along the longitudinal extent of the damper, wherein a small retracted length means the arrangement of the swivel axis more towards the upper part and hence towards the spring, and a longer retracted length means the arrangement of the swivel axis further away from the upper part.

Depending on the retracted length, a middle region of varying softness of the vehicle oscillation device can be achieved. If higher damper forces are required towards the end of the spring travel, a damper with harder tension/rebound stage damping is selected.

The diagram shows the damper piston travel covered in relation to the spring travel in one direction. This corresponds to curves 30, 31 and 32. With a short leg design, for example with a retracted length of 10 mm, the damper piston covers a travel of 4 mm while the spring travel of the spring is already 10 mm. With a longer leg design according to curve 30, for example with a retracted length of 50 mm, the piston of the damper covers a travel of 1 mm while the spring travel covered is already 10 mm.

Curves 33, 34 and 35 show the resulting speeds of the oscillation movement along the spring travel in relation to the speed of the damper along the damper travel during its retraction and extension. With a short leg design with a retracted length of 10 mm according to curve 35, on a spring travel of 10 mm the speed of the damper is transmitted with a factor of 0.7 while on a spring travel of 25 mm the speed is transmitted with a factor of 0.9 and hence the damper force increased or reduced by 0.9 on extension and retraction of the damper.

With a long leg design with a retracted length of 50 mm according to curve 33 however, the speed-dependent progression of the damper at 10 mm acts with a factor of 0.19, whereas with a spring travel of 25 mm the damper force is increased or reduced by 0.44. Curves 31 and 34 correspond to the associated values for a damper with a retracted length of 30 mm.

Thus the speed-dependent progression of the damper is accompanied by a different translation ratio depending on the extended position of the vehicle oscillation device in its actual movement direction with the spring travel, wherein this movement is a degressive distance-dependent movement. Due to this degressive translation, a progressively acting damper can be designed soft in the centre of the spring travel.

All features disclosed in the application documents are claimed as essential to the invention where novel individually or in combination in relation to the prior art.

LIST OF REFERENCE NUMERALS

1 Lower part
2 Upper part
2*a*, 2*b* Parts of upper part
3, 3*a*, 3*b*, 4, 4*a* Damper
5, 5*a* First end
6, 6*a* First end
7, 7*a*, 7*b*, 18, 18*a*, Spring
8 Peg
9 Arrow
10 Extension arm
11 Arrow
12 Bolt-like element
13 Damper element
14 First end of spring
15 Other end of spring
16 First end
17 Swivel head
19 First end of spring
20 Second end of spring
21 Vehicle longitudinal direction
22 Vehicle width direction
23 Air spring
24 Axis
25 Rod
30, 31, 32, 33, 34, 35 Curves

The invention claimed is:

1. A vehicle oscillation device comprising a lower part (1) and an upper part (2, 2*a*, 2*b*) spring-mounted in relation to the lower part (1) in the vehicle longitudinal direction (21) and/or vehicle width direction (22) by means of a spring device (7, 7*a*, 7*b*, 8; 18), wherein the vehicle longitudinal direction (21) and/or the vehicle width direction (22) constitute spring travel directions (9, 11), characterised by a first damper (3, 3*a*; 4, 4*a*), which extends with its longitudinal extent in a plane defined by the vehicle longitudinal direction (21) and the vehicle width direction (22), mounted pivotable on the lower part (1) about an axis (17, 24) oriented perpendicular to the plane, and connected with a first end (5, 5*a*; 6, 6*a*; 16) to the upper part (2), and by a second damper (4, 4*a*), a first end (6, 6*a*) of which is also connected with the upper part (2*b*) and which is mounted pivotably about the axis (24) or a further axis, wherein the two dampers (3, 4) in an undeflected position of the spring-mounted upper part (2) are arranged in their longitudinal extents on a common straight line.

2. The vehicle oscillation device according to claim 1, characterised in that the first and second dampers (3, 4) in the undeflected position of the spring-mounted upper part (2) extend in their longitudinal extents perpendicular to the spring travel direction (9, 11).

3. The vehicle oscillation device according to claim 1, characterised in that the first and second dampers (3, 3*a*, 3*b*; 4, 4*a*) are formed in such a way that when tensile loading is applied to the dampers (3, 3*a*, 3*b*; 4, 4*a*) a first damper force with damping effect is different from a second damper force with damping effect when compressive stress is applied to the dampers (3, 3*a*, 3*b*; 4, 4*a*).

4. The vehicle oscillation device according to claim 1, characterised in that the spring device comprises at least one first coil spring (7, 7*a*, 7*b*) extending in the spring travel direction (9, 11), a first end (14) of which is connected with the upper part (2) and a second end (15) of which is connected with the lower part (1).

5. The vehicle oscillation device according to claim 1, characterised in that the spring device comprises at least one coil spring (18) arranged in or on the at least one of the first or second dampers (3, 3*a*, 3*b*; 4, 4*a*), a first end (19) of the coil spring is connected with a first end (16) of the at least one of the first or second dampers (3, 3*a*, 3*b*; 4, 4*a*) and a second end (20) of the coil spring is connected with a second end of the at least one of the first or second dampers (3, 3*a*, 3*b*; 4, 4*a*).

6. The vehicle oscillation device according to claim 1, further comprising at least one elastomer part arranged in or on the damper (3, 3*a*, 3*b*; 4, 4*a*) to attenuate acceleration maxima of the oscillation or springing movement of the device.

* * * * *